United States Patent [19]

Kishi

[11] Patent Number: 5,665,663

[45] Date of Patent: *Sep. 9, 1997

[54] METHOD FOR MANUFACTURING OXIDE CERAMIC SINTERED BODIES

[75] Inventor: Yukio Kishi, Funabashi, Japan

[73] Assignee: Nihon Cement Co., Ltd., Tokyo, Japan

[*] Notice: The term of this patent shall not extend beyond the expiration date of Pat. No. 5,492,872.

[21] Appl. No.: 554,098

[22] Filed: Nov. 6, 1995

Related U.S. Application Data

[63] Continuation of Ser. No. 87,746, filed as PCT/JP92/01267, filed Jan. 01, 1992, abandoned.

[51] Int. Cl.⁶ .................................................. C04B 35/46
[52] U.S. Cl. ........................ 264/628; 264/666; 264/676; 501/134
[58] Field of Search ...................... 264/65, 66; 501/134

[56] References Cited

U.S. PATENT DOCUMENTS

| | | | |
|---|---|---|---|
| 3,459,503 | 8/1969 | Roy et al. | 501/134 |
| 4,677,082 | 6/1987 | Alford et al. | 501/134 |
| 4,849,142 | 7/1989 | Panda et al. | 264/65 |
| 4,952,537 | 8/1990 | Hayashi et al. | 501/153 |
| 5,001,093 | 3/1991 | Roy et al. | 264/65 |
| 5,492,872 | 2/1996 | Kishi | 501/134 |

FOREIGN PATENT DOCUMENTS

| | | |
|---|---|---|
| 0 140 638 | 5/1985 | European Pat. Off. . |
| 1-129904 | 5/1989 | Japan . |
| 3-150258 | 6/1991 | Japan . |
| 03150258 | 6/1991 | Japan . |
| 4-114984 | 4/1992 | Japan . |
| 04114984 | 4/1992 | Japan . |

OTHER PUBLICATIONS

Database WPI, Section Ch, Week 9425, Derwent Publications Ltd. London,GB; JP-A-06 144 920 (Nippon Cement KK), 24 May 1994.

Patent Abstracts of Japan, JP-A-63 241408 (Narumi China Corp) 6 Oct. 1988.

*Primary Examiner*—Melissa Bonner
*Attorney, Agent, or Firm*—Jacobson, Price, Holman & Stern, PLLC

[57] ABSTRACT

An oxide ceramic sintered body of a single component having a purity of at least 99% by weight of titania and a surface with a plurality of pores therein not exceeding 100 pores per square millimeter. The sintered ceramic body is made by preparing a raw titania powder having a purity of at least 99% titania by weight and an average maximum particle diameter of 1 μm, compacting the titania powder to produce a compact, sintering the compact at a temperature in the range of about 1000° C. to about 1300° under ordinary pressure in air, or an inert or reducing atmosphere. The sintered ceramic body may be hot isostatic pressure treated below the sintering temperature in an inert atmosphere under a pressure of at least 500 kg/cm² to further reduce the number of pores in the surface. The number of pores in the surface is determined by pressing the sintered ceramic body in sliding contacting engagement with a polishing buff sprinkled with carbon black so that the carbon black is forced into the pores to produce black spots on the surface representing the pores, and thereafter counting the black spots by inspecting the surface under a microscope to determine the number of pores.

5 Claims, No Drawings

METHOD FOR MANUFACTURING OXIDE CERAMIC SINTERED BODIES

This is a continuation of application Ser. No. 08/087,746, filed Jul. 12, 1993 which was abandoned, which in turn is a nationalization of PCT/JP92/01267 filed Oct. 1, 1992, now abandoned.

BACKGROUND OF THE INVENTION

This invention relates to materials for fabrication into vacuum chucks, vacuum tweezers, remotely controlled hands, and other products which are used in handling Si wafers in the semiconductor industry, as in cleaning, transferring, and surface-treating the wafers, and which therefore should be protected against the deposition or adsorption of dirt and other impurities; materials for various industrial mirrors and other devices in which the existence of pores is to be avoided; and materials for pieces in the field of personal ornaments, including tie-pins, earrings, and pendants, that are required to be lustrous and not easily soiled; and the invention relates also to a method of manufacturing those materials.

In the manufacture of the vacuum chucks, vacuum tweezers, and the like employed in the operations for transfer, cleaning, and surface treatment of Si wafers in the semiconductor industry, ceramic materials have been used with the view of avoiding the intrusion of metallic elements into the wafers or the contamination with such elements. The ceramic materials used are in many cases alumina and infrequently silicon carbide.

The products fabricated from the ceramic materials usually are used after their portions to come in contact with Si wafers have been ground and lapped. At times pores that the ceramic material itself has remain exposed on the lapped surface and attract dirt and dust. With the tendency toward higher density and larger-scale integration of semiconductor elements, the possibility of the dirt and dust in the pores of the ceramic material gaining entrance into the process of fabrication has posed a problem.

To settle this problem, various less porous ceramic materials have been studied. However, even the least porous material has about 300 pores per square millimeter, and it is not fully satisfactory yet to meet the requirement of the semiconductor industry that is directed toward much larger-scale integration.

BRIEF SUMMARY OF THE INVENTION

It is an object of the invention to solve the above problem by use of an oxide ceramic material of a single component sintered at a relatively low temperature which has an unusually small number of pores.

The above object is achieved by the invention in which an oxide ceramic sintered body of a single component is produced by compacting an oxide ceramic powder having an average particle diameter of no more than 1 micron and a purity of at least 99%, sintering the compact in air or in an inert or reducing atmosphere at 1000° to 1500° C., polishing the sintered body to a mirror surface, forcing the surface against a buff sprinkled with carbon black, and moving the surface in sliding contact with the buff to force the carbon black into the pores in the surface and produce black spots therein representing the pores, and counting the black spots to determine the number of pores. The sintered ceramic body produced by this method has a purity of at least 99% by weight titania and a surface thereon having a plurality of pores therein not exceeding 100 pores per square millimeter.

The sintered ceramic body may be further subjected to hot isostatic pressure treatment before treating with the carbon black to further reduce the number of pores in the surface.

DETAILED DESCRIPTION

The invention will be described in detail below.

The essence of the invention resides in the fact that when a fine, high-purity oxide ceramic powder is chosen as a raw material and fired below the usual firing temperature for oxide ceramics, the product attains an adequate sintered density while an increase in size of the pores is avoided by inhibiting the particle growth. The reason is yet to be clarified theoretically, but it is presumed that, whereas the progress of sintering usually causes pores to collect and grow to an appreciable degree in the grain boundary phase, a quite fine, high-purity oxide ceramic powder used as a material allows the pores to remain in the crystal grains as pores of almost microscopically unobservable able size (known as "ghost pores"), precluding the possibility of pore growth in the crystalline grain boundary.

Where necessary, a HIP treatment (hot isostatic pressing treatment) may be performed in the same temperature range as the firing temperature to reduce the number of microscopically observable pores to almost nil.

The expression "fired below the usual firing temperature for oxide ceramics" as used herein means, in general terms, being fired in the temperature range between 1000° and 1500° C. Within this temperature range the temperature used varies with the particular oxide ceramic material. For example, the temperature for alumina ceramics ranges from 1200° to 1500° C. and that for titania ceramics from 1000° to 1300° C. In both cases the firing temperatures are lower than ordinary firing temperatures. A lower temperature below the firing temperature specified under the invention does not allow the sintering itself to proceed, while a higher temperature causes rapid particle growth, resulting in the migration of pores to the grain boundary phase and an increase in the size of pores due to the particle growth.

If the raw powder does not have a purity of at least 99% or if its average particle diameter is larger than one micron, the powder loses the property of being easily sintered at low temperature and does not attain an adequate sintered density. If it is sintered at elevated temperature to increase the sintered density, attendant particle growth makes the pores coarser.

For these reasons the purity of the raw powder is specified to be at least 99%, preferably at least about 99.8%, and the average particle diameter of the powder is no more than 1 micron, preferably about 0.5 micron.

The raw oxide ceramic powder is compacted in a variety of ways. For example, for the fabrication of such thin-sheet products as vacuum chucks or vacuum tweezers, the powder is compacted into sheets by the doctor blade method or by extrusion. For the quantity production of tiepins, earrings, or other personal ornaments, mechanical press compacting is used. Mirrors and other large-area flat sheets are made from the powder compacted by CIP (cold isostatic pressing), casting, or other similar technique. Whatever compacting method is resorted to, an organic binder suited for the particular method is used as a compacting assistant.

The resulting compact is fired at a temperature in the optimum firing temperature range of 1000° to 1500° C., and an oxide ceramic material with an unusually small number of pores is obtained.

Where it is necessary to eliminate almost all pores, HIP treatment is performed. The HIP treatment is carried out below the firing temperature in order to suppress an increase in the size of pores due to particle growth.

The atmosphere for firing may be either air or a non-air surrounding gas such as argon. The firing atmosphere may also be an inert or reducing atmosphere. So far as pores are concerned, the HIP treatment temperature and pressure are important considerations.

The oxide ceramic sintered body thus obtained is machined, e.g., by surface grinding, joining, or lapping, to a finished product. An important property of the product is low porosity, and in the present invention that particular property of the product has been evaluated.

This is because, as is common with oxide ceramics, the ceramic product appears to become increasingly transparent, tending to defy focusing, as the pores decrease in size and number. Thus the pores become difficult to observe in the microscopic structural study.

It has been customary in such a case to polish the surface to a mirror finish and deposit gold or the like by evaporation on it for easier observation. The present invention uses a technique of improving pore visibility by filling the pores with fine black powder of carbon black and increasing the contrast in the visual field of the microscope.

EXAMPLE 1

To a titania powder having an average particle diameter of 0.25 micron and a purity of 99.8% (a titania powder made by Ishihara Sangyo Kaisha under the trade name "CREL") was added 2% polyvinyl alcohol as a compacting assistant. The mixture was mixed in a mortar, dried, and sieved for particle size regulation. The mixture was compacted by CIP at a pressure not lower than 100 kg/cm$^2$ and sintered at ordinary pressure in air at 1000° to 1300° C. Part of the sintered body was additionally treated by HIP in an argon atmosphere at 800° to 1300° C. and at a pressure of at least 500 kg/cm$^2$. The ordinary-pressure sintered body and the HIP-treated body were both ground and polished and then forced against a buff sprinkled with carbon black and moved in sliding contact with the buff, and inspected under an optical microscope The results of the present invention are given under Nos. 1 and 2 in Table 1.

| Sample No. | Type of oxide | Purity (%) | Average particle diameter (micron) | Ordinary pressure sinter. temp. (°C.) | HIP treating conditions Temp. (°C.) | Pressure (kg/cm$^2$) | No. of black spots (Pores/mm$^2$) |
|---|---|---|---|---|---|---|---|
| Example | | | | | | | |
| 1 | TiO$_2$ | 99.8 | 0.25 | 1200 | (untreated) | | 72 |
| 2 | TiO$_2$ | 99.8 | 0.25 | 1200 | 1000 | 1500 | 35 |
| 3 | Al$_2$O$_3$ | 99.9 | 0.4 | 1400 | (untreated) | | 84 |
| 4 | Al$_2$O$_3$ | 99.9 | 0.4 | 1400 | 1350 | 1800 | 47 |
| Comparative Example | | | | | | | |
| 5 | TiO$_2$ | 99.8 | 0.25 | 1600 | (untreated) | | 830 |
| 7 | TiO$_2$ | 99.8 | 0.25 | 1600 | 1400 | 1500 | 490 |
| 8 | TiO$_2$ | 92.0 | 0.7 | 1400 | (untreated) | | 950 |
| 9 | TiO$_2$ | 92.0 | 0.7 | 1400 | 1200 | 1800 | 560 |
| 10 | TiO$_2$ | 99.2 | 2.1 | 1400 | (untreated) | | 710 |
| 11 | TiO$_2$ | 99.2 | 2.1 | 1400 | 1200 | 1800 | 320 |
| 12 | Al$_2$O$_3$ | 99.2 | 0.6 | 1600 | (untreated) | | 1,200 |
| 13 | Al$_2$O$_3$ | 99.2 | 0.6 | 1600 | 1400 | 1800 | 800 |
| 14 | Al$_2$O$_3$ | 96.0 | 0.5 | 1500 | (untreated) | | 1,000 |
| 15 | Al$_2$O$_3$ | 96.0 | 0.5 | 1500 | 1400 | 1800 | 450 |
| 16 | Al$_2$O$_3$ | 99.5 | 3.5 | 1500 | (untreated) | | 1,150 |
| 17 | Al$_2$O$_3$ | 99.5 | 3.5 | 1500 | 1400 | 1800 | 630 |

First, an oxide sintered body is polished using a diamond disk, buff or the like to a mirror surface, as in ordinary structural observation. Then, carbon black rather than diamond powder is sprinkled over a polishing buff, and the buff is pressed against the mirror surface and moved in sliding contact with it to force the carbon black into the pores. The mirror surface is inspected under the microscope and the number of black spots, or the pores filled with carbon black, per square millimeter is counted. A HIP-treated oxide ceramic blackens and looks less transparent, but the number of black spots on it was counted in the same manner as described above.

When evaluated in the foregoing way, the oxide ceramics according to the present invention were found to have unusually small numbers of pores, all less than 100/mm$^2$.

BEST MODE FOR CARRYING OUT THE INVENTION

Examples of the invention will now be described.

EXAMPLE 2

An alumina powder having an average particle diameter of 0.4 micron and a purity of 99.9% (a product of Taimei Chemical Co., trade-named "Taimicron") was used as a raw material and compacted in the same way as described in Example 1, and the compact was sintered in air at ordinary pressure and at 1200° to 1500° C. Part of it was additionally HIP-treated in a nitrogen atmosphere at 1000° to 1500° C. and at no less than 500 kg/cm$^2$. The ordinary-pressure sintered body and the HIP-treated body were polished and observed under an optical microscope in the manner described in Example 1. The results are represented by Nos. 3 and 4 in Table 1.

COMPARATIVE EXAMPLE 1

CIP compacts were made by the same procedures as used in Examples 1 and 2 and then sintered at ordinary firing temperatures or HIP-treated at elevated temperatures. The results are given in Nos. 5 to 17 in Table 1.

Industrial Applicability

As described above, firing a high-purity, fine oxide ceramic powder below ordinary firing temperatures makes it possible for the sintered product to have pores in a state not observable under a microscope (called "ghost pores"). The product may be treated by HIP when desired. In this way oxide ceramic sintered bodies having unusually small numbers of pores, gloss, and excellent surface smoothness have been obtained. They are useful for the articles of the semiconductor industry which must be protected against dirt and dust for the sake of large-scale integration; for industrial mirrors; and for personal ornamental pieces.

I claim:

1. A method for manufacturing a titania ceramic body, which has a surface with a plurality of pores not exceeding 100 pores per square millimeter, comprising:

preparing a new titania powder having a purity of at least 99.8 wt % titania by weight and an average particle diameter up to 0.5 μm;

compacting said titania powder to produce a compact;

sintering said compact at a temperature in the range of about 1000° C. to about 1300° C. under ordinary pressure in a gas selected from the group consisting of air, an inert atmosphere and a reducing atmosphere to produce body;

hot isostatic pressure treating said sintered body at a temperature in the range of about 800° C. to the temperature at which said sintering is carried out in an argon atmosphere under pressure of at least 500 kg/cm$^2$ to produce a ceramic body; and grinding and polishing said ceramic body to produce a final ceramic body.

2. The method as claimed in claim 1 wherein:

said average particle diameter is no greater than 0.3 μm.

3. The method as claimed in claim 1 and further comprising:

providing a polishing buff sprinkled with carbon black;

pressing said final ceramic body and buff together;

relatively moving said body and buff with respect to each other in sliding contacting engagement to force said carbon black into said pores and produce black spots in said surface representing said pores; and counting said black spots to determine said number of pores.

4. The method as claimed in claim 1 wherein:

said inert atmosphere in said sintering step is argon.

5. The method as claimed in claim 1 wherein: said ceramic body has a surface with a plurality of pores therein not exceeding 35 pores per square millimeter.

* * * * *